US012734921B2

(12) United States Patent
Arata et al.

(10) Patent No.: US 12,734,921 B2
(45) Date of Patent: Sep. 15, 2026

(54) CONTROL SYSTEM FOR ELECTRIC WORK VEHICLE

(71) Applicant: KANZAKI KOKYUKOKI MFG. CO., LTD., Amagasaki (JP)

(72) Inventors: Masato Arata, Amagasaki (JP); Fumiaki Ito, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 725 days.

(21) Appl. No.: 18/321,882

(22) Filed: May 23, 2023

(65) Prior Publication Data

US 2023/0391220 A1 Dec. 7, 2023

(30) Foreign Application Priority Data

Jun. 6, 2022 (JP) ................................ 2022-091895

(51) Int. Cl.

*H02J 7/00* (2026.01)
*B60L 50/51* (2019.01)
*B60L 53/22* (2019.01)
*B60L 53/62* (2019.01)
*B60L 58/20* (2019.01)

(52) U.S. Cl.

CPC ............... *B60L 53/62* (2019.02); *B60L 50/51* (2019.02); *B60L 53/22* (2019.02); *B60L 58/20* (2019.02); *B60L 2200/40* (2013.01); *B60L 2210/10* (2013.01)

(58) Field of Classification Search

USPC ........................................................ 320/109
See application file for complete search history.

(56) References Cited

U.S. PATENT DOCUMENTS 5,512,789 A * 4/1996 Lyon ......................... F01N 9/00 219/205
5,717,310 A * 2/1998 Sakai ................ G01R 31/3648 320/134

(Continued)

FOREIGN PATENT DOCUMENTS

JP 2013066290 A 4/2013

*Primary Examiner* — Samuel Berhanu
(74) *Attorney, Agent, or Firm* — CANTOR COLBURN LLP

(57) ABSTRACT

[Problem] In a control system for an electric work vehicle, a space for a size increase of other components such as a high-voltage battery is increased, and a labor for battery replacement is reduced by eliminating a need for mounting a low-voltage battery. [Solution] The control system includes a traveling motor to which power is fed from a battery via a main switch, a control device which controls an ON/OFF state of the main switch, and a first start switch connected between an output side of a DC-DC converter and the control device and is configured such that a primary side of the main switch is connected to an input side of the DC-DC converter with a second start switch interposed, and the control device is started by an output voltage of the DC-DC converter by an operation of the second start switch to an energized position. The control device turns on the main switch and maintains the state when the second start switch is operated to an energized position and the first start switch is at an operation position to the energized position.

5 Claims, 11 Drawing Sheets

(56) References Cited

U.S. PATENT DOCUMENTS

| | | | | |
|---|---|---|---|---|
| 2009/0173554 | A1* | 7/2009 | Yoshioka | H02J 9/005 318/434 |
| 2021/0031748 | A1* | 2/2021 | Watanabe | B60W 10/30 |
| 2022/0131200 | A1* | 4/2022 | Thumfart | H01M 10/425 |

* cited by examiner

LOAD VEHICLE-SPEED CONTROL
OFF
ON
WORK-PORTION SPEED
LOW
HIGH
BACKWARD WORK
OFF
ON
OFF
ON
START 1
START 2
CRUISE
EMERGENCY STOP
WORK STOP
36a
37
36
38
39
40
62
63
64
64a
65
66
67
68
69
70
72
73
74
75
32

CONTROL SYSTEM FOR ELECTRIC WORK VEHICLE

CROSS REFERENCE TO RELATED APPLICATIONS

The present invention claims priority under 35 U.S.C. § 119 to Japanese Application, 2022-091895, filed on Jun. 6, 2022, the entire contents of which being incorporated herein by reference.

TECHNICAL FIELD

The present invention relates to a control system for electric work vehicles.

BACKGROUND ART

A work vehicle including a work implement has been known. For example, a lawn mowing vehicle (work vehicle) including a lawn mowing device as a work implement which is driven to perform lawn mowing works has been known. In such a work vehicle, an electric work vehicle whose wheels are driven by a traveling motor, which is an electric motor, is also considered.

Patent Document 1 describes an agricultural tractor (electric work vehicle) which can charge a battery mounted on the vehicle from an external power-feed facility and can supply power from the battery to an electric motor for driving the rear wheels (traveling motor). In this vehicle, a power-supply state switch is provided at a position which covers a charging connection portion connecting an external connection portion of the external power-feed facility, and the switch can be removed from the covered position by operating a key member.

PRIOR ART DOCUMENT

Patent Document

Patent Document 1: Japanese Unexamined Patent Application Publication No. 2013-66290

SUMMARY OF INVENTION

Technical Problem

By the way, in the electric work vehicles, there are conventionally high-voltage driven electrical components such as a traveling motor and an inverter for driving the traveling motor, which are driven by a high voltage such as 50 V, and low-voltage driven electrical components such as a control device (ECU), which is driven by a low voltage such as 12 V, with an indicator or the like. Thus, in order to shut off the power supply from the battery to all the electrical components when the vehicle's control system is stopped, a high-voltage battery and a low-voltage battery are installed, and when the system stop is instructed by operating the start switch, it is considered that the control device executes predetermined end processing to ensure vehicle's safety and then, shuts off the power supply to all the electrical components.

However, since two types of batteries, that is, a low-voltage battery and a high-voltage battery, are needed, a need to periodically replace the low-voltage battery arises. In addition, the installation of the low-voltage battery reduces a space for the high-voltage battery, and there is a room for improvement from the viewpoint of extending a cruising distance of the vehicle by mounting a high-capacity battery.

An object of the present invention is to enlarge the space for a size increase of the other components such as a high-voltage battery and to reduce a labor for battery replacement by eliminating the need for mounting a low-voltage battery in the control system of an electric work vehicle.

Solution to Problem

A control system for an electric work vehicle according to the present invention is a control system for an electric work vehicle, including a battery, a traveling motor to which power is fed from a battery via a main switch, a control device which controls an ON/OFF state of the main switch, a DC-DC converter which steps down a voltage of the battery and outputs the voltage to the control device, and a first start switch which is interposed and connected between an output side of the DC-DC converter and the control device and capable of manual energization, in which a primary side of the main switch is connected to an input side of the DC-DC converter with a second start switch capable of manual energization interposed therebetween, a secondary side of the main switch is directly connected to the input side of the DC-DC converter, and the control device is configured to be started by an output voltage of the DC-DC converter by an operation of the second start switch to an energized position of the second start switch, and the control device turns on the main switch when the second start switch is operated to the energized position and the first start switch is at the energized position, and maintains an ON state of the main switch even after the operation of the second start switch to a shut-off position.

According to the control system for an electric work vehicle according to the present invention, since only a battery with a voltage higher than the voltage input to the control device needs to be mounted on a vehicle as a battery, mounting of a low-voltage battery on the vehicle becomes unnecessary. At the start of the system, by operating the second start switch to the energized position after the first start switch is operated to the energized position, power can be fed from the battery to the control device and the traveling motor via the switch even after the second start switch is operated to the shut-off position. When the system is stopped, the control device executes the predetermined end processing after the operation of the first start switch to the shut-off position, it can turn off the switch and can stop the power feeding from the battery to the traveling motor and the control device. As a result, the system can be stopped safely without providing a low-voltage battery. Thus, a space for the size increase of the other components such as a high-voltage battery can be enlarged, and the labor for battery charging can be reduced.

In the control system for the electric work vehicle according to the present invention, it may be so configured that a working motor for driving the work implement to which power is fed from the battery via the main switch is provided, and when the first start switch is operated to the shut-off position, after executing the predetermined end processing including setting of target rotation numbers of rotation speeds of the traveling motor and the working motor to 0, the control device turns off the main switch and stops the power feeding to the traveling motor, the working motor, and the control device from the battery.

According to the above configuration, the system of the vehicle can be stopped more safely by operating the first start switch to the shut-off position without providing a low-voltage battery.

In the control system for the electric work vehicle according to the present invention, it may be so configured that a charging port which can be connected to an external power-feed facility via a charger and is connected to the battery via the main switch is provided, and when the second start switch is operated to the energized position, the first start switch is off, and the charger is connected to the charging port, the control device turns on the main switch and feeds power to the battery and the control device maintains the ON state of the main switch even after the operation of the second start switch to the shut-off position.

According to the above configuration, when the battery is to be changed from an external power-feed facility, by operating the second start switch to the energized position, the charging operation can be performed while starting the control device and thus, a stable charging work of the battery can be performed easily.

In the control system for the electric work vehicle according to the present invention, it may be so configured that the first start switch is a two-position switch and the second start switch is a push switch in which the state operated to the energized position is not self-retained.

According to the above configuration, when a user operates the second start switch to the energized position at start of the system, such a state can be prevented that the state is unintentionally continues and hinders other control processing.

In the control system for the electric work vehicle according to the present invention, it may be so configured that, when the charger is connected to the charging port, if the charging is not started within a predetermined time from the operation of the second start switch to the energized position, the control device turns off the main switch as abnormality occurrence processing.

According to the above configuration, safety of the vehicle can be improved when there is a high possibility of defective charging.

Advantageous Effects of Invention

According to the control system for the electric work vehicle according to the present invention, mounting of a low-voltage battery becomes unnecessary, a space for a size increase of the other components such as a high-voltage battery can be enlarged, and a labor for the battery replacement can be reduced.

BRIEF DESCRIPTION OF DRAWINGS

FIG. 2 is a schematic diagram of an A-A section in FIG. 1.

FIG. 6 is a diagram corresponding to a front side part of FIG. 1 illustrating a state where a bonnet is opened, and a junction box and a DC-DC converter are taken out.

DESCRIPTION OF EMBODIMENTS

An embodiment of the present invention will be described later in detail with reference to the accompanying drawings. Although a case in which an electric work vehicle is a lawn mowing vehicle will be explained below, the electric work vehicle is not limited to a lawn mowing vehicle but may be any other work vehicles including a work implement that performs one or more of a snow removal work, an excavation work, a civil engineering work, and an agricultural work. Moreover, a case in which a work vehicle has a steering wheel as a travel instruction tool and uses an accelerator pedal provided on a front side of a seat as the travel instruction tool will be basically explained below, but this is only an example, and regarding at least an invention related to disposition of a junction box or an inverter, it may be so configured that the present invention is applied to a vehicle having two operation levers, left and right, as the travel instruction tool also serving as a turning instruction portion. In this case, the term travel in the travel instruction tool is used as a meaning excluding turning. Shapes, numbers, disposition relationships of components and the like which will be explained below are only examples for explanation and can be changed as appropriate to comply with specifications of the work vehicle. In the following, the same signs are given to similar elements in all of the drawings, and duplicated explanation will be omitted or simplified.

Figure 1:
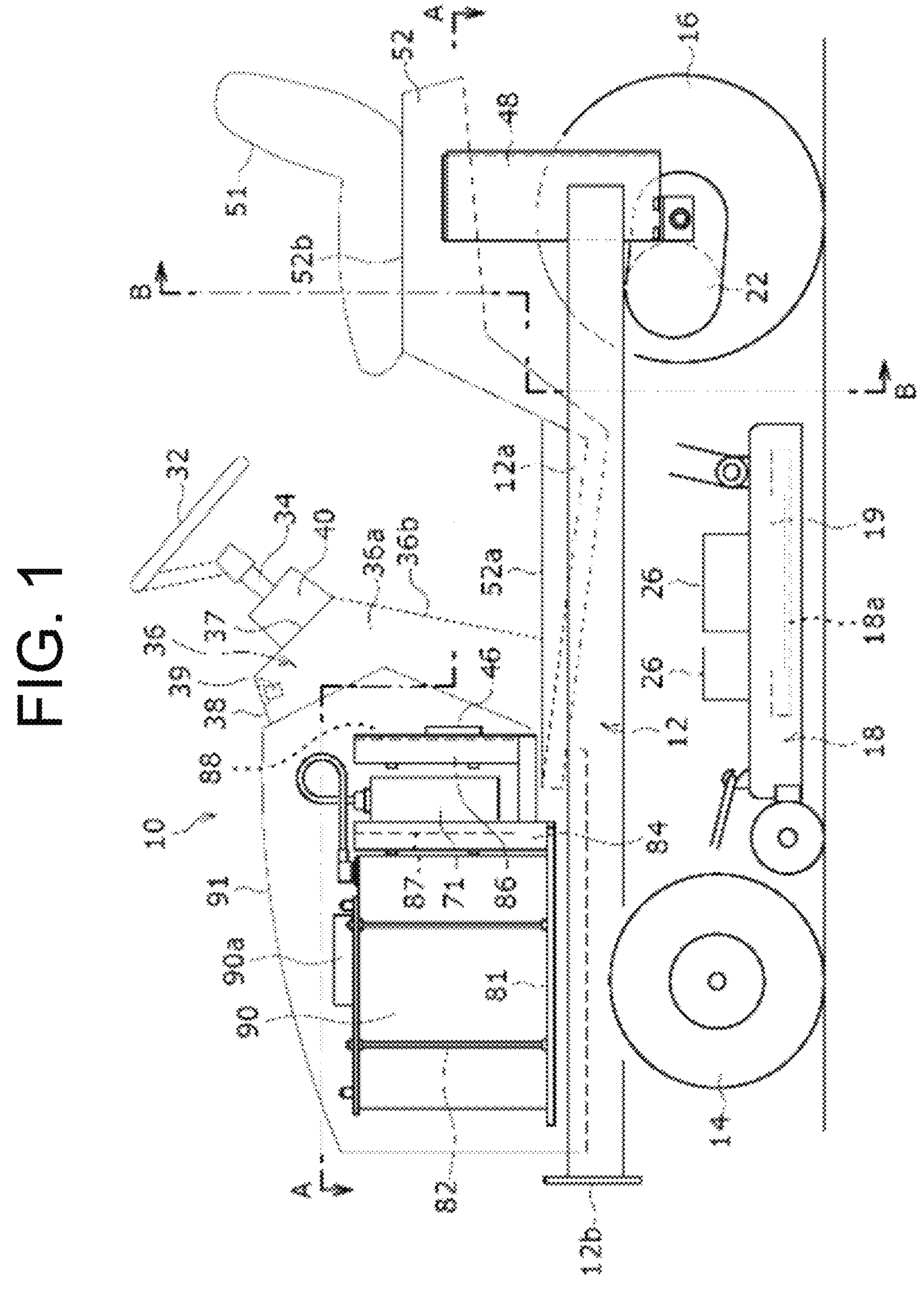
FIG. 1 is a schematic diagram illustrating an electric work vehicle including a control system of an embodiment according to the present invention, viewed from one side in a width direction and partially sectioned.
Figure 2:
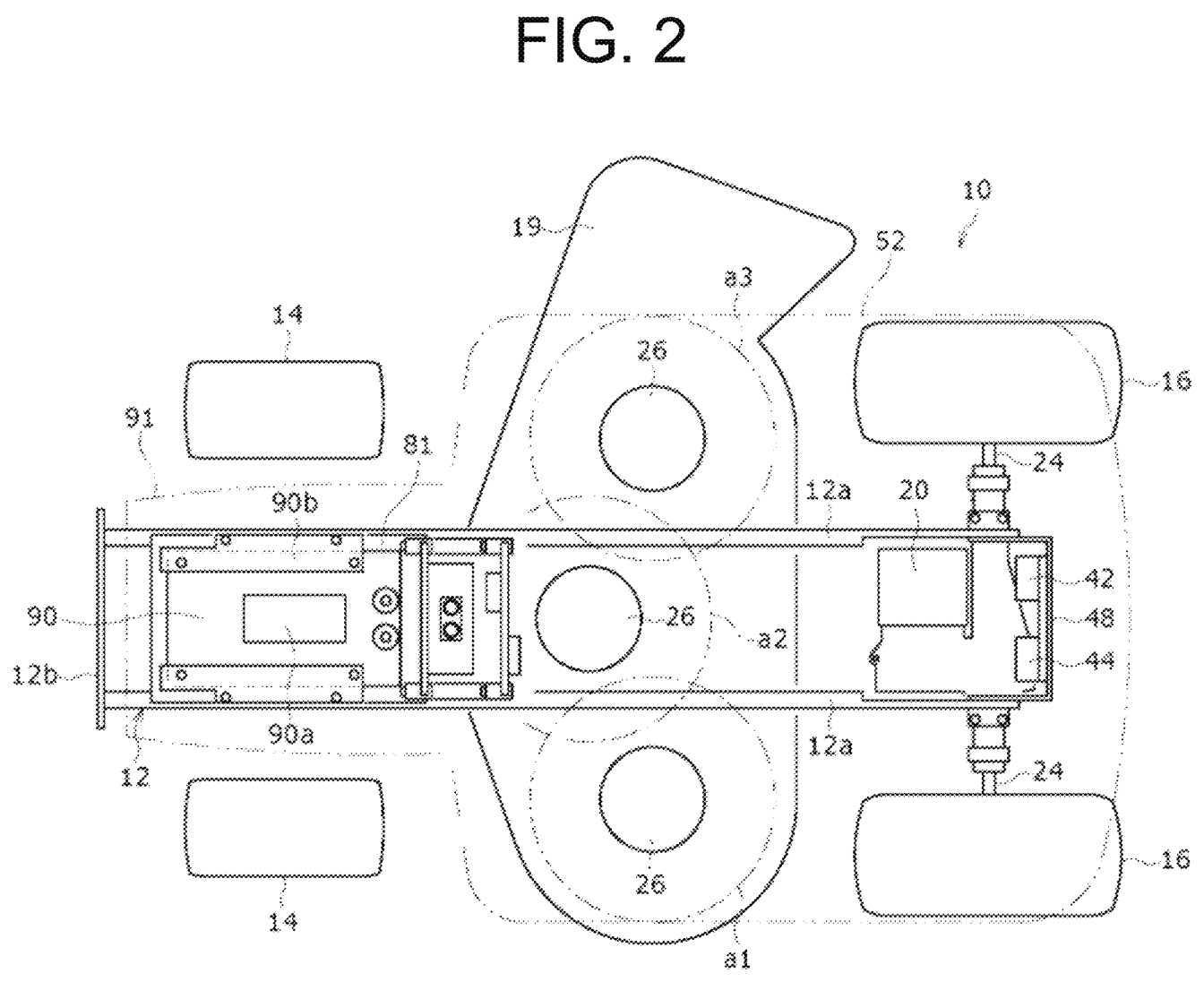
Figure 3:
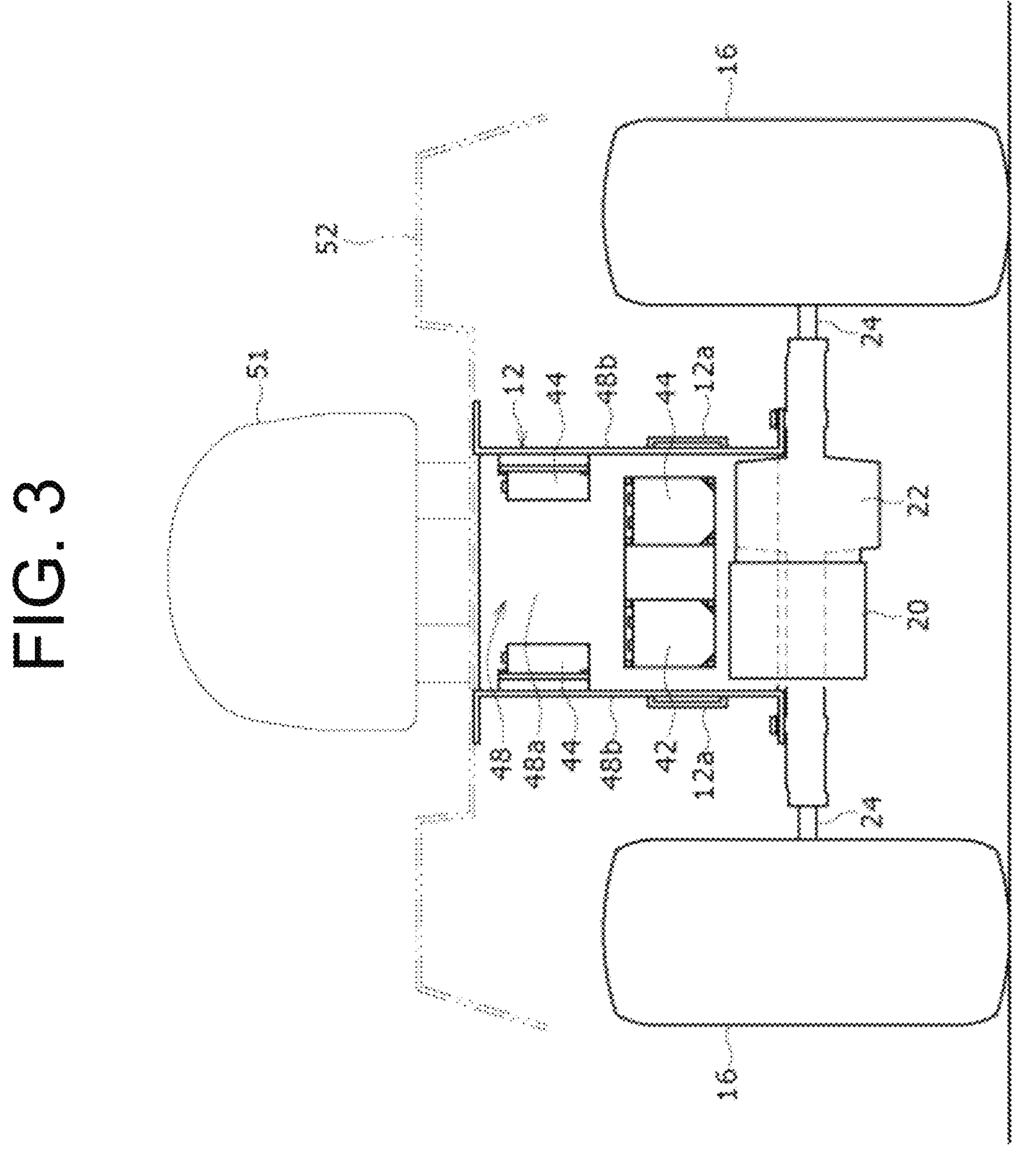
FIG. 3 is a schematic diagram of a B-B section in FIG. 1.

FIG. 1 to FIG. 8 illustrate an embodiment of the present invention. FIG. 1 is a schematic diagram illustrating an electric work vehicle 10 including a control system of an embodiment, viewed from one side in a left-right direction, which is a width direction and partially sectioned. FIG. 2 is a schematic diagram of an A-A section in FIG. 1. FIG. 3 is a schematic diagram of a B-B section in FIG. 1. Hereinafter, the electric work vehicle 10 is referred to as the vehicle 10.

The vehicle 10 is a passenger-type self-propelled lawn mowing vehicle suitable for lawn mowing. The vehicle 10 includes a vehicle-body frame 12, two front wheels 14, left and right, supported on the front side of the vehicle-body frame 12 and two rear wheels 16, left and right, supported on the rear side, a lawn mowing device 18, which is a work implement, a traveling motor 20 (FIG. 2), which drives the rear wheels 16 among the front wheels 14 and the rear wheels 16, three deck motors 26, which are working motors, a steering handle 32, and an accelerator pedal (not shown). The vehicle 10 further includes a traveling inverter 42, three deck inverters 44, a control device (ECU) 46, which constitute a control portion 100 and a battery 90. Each of the traveling motor 20 and the deck motor 26 is an electric motor. The traveling inverter 42 corresponds to a first inverter, and the deck inverter 44 corresponds to a second inverter.

The vehicle-body frame 12 is formed of metal such as steel into a beam structure or the like. The vehicle-body frame 12 includes two side frames 12*a* substantially along a front-back direction of the machine body at both left and right ends, a front-end connecting portion 12*b* that connects front ends of the two side frames 12*a*, and an inverter mounting member 48 that connects the rear ends. Each of the side frames 12*a* is formed by including a main-body plate portion along an up-down direction and the front-back direction and two lateral plate portions projecting outward in the left-right direction from both upper and lower end parts of the main-body plate portion, and an opening of the side frame 12*a* is directed toward a center in the left-right direction of the vehicle. The front-end connecting portion 12*b* has a plate shape projecting to the front end of the vehicle and extending in the left-right direction and has a function as a bumper. The inverter mounting member 48 will be described in more detail later. On upper sides of the rear end parts of the two side frames 12*a*, a driver's seat 51, on which the driver as a user is seated, is fixed via the inverter mounting member 48 and a support member 52.

The support member 52 is supported on the upper side of the left and right side frames 12*a* in the vehicle-body frame 12 and includes a front portion 52*a* on which the driver onboard the vehicle 10 places the driver's feet and a rear portion 52*b* that rises upward toward the rear and whose both left and right end parts on the rear side are fender portions covering the upper sides of the two rear wheels 16. That is, on the upper end part of the rear portion 52*b* of the support member 52, two shoulder portions project upward at intervals on both left and right sides, and the driver's seat 51 is fixed to a portion depressed downward between the two shoulder portions.

On the front side of the driver's seat 51, a steering shaft 34 is rotatably supported by a steering column 36, and a steering handle 32 is fixed to the upper end of the steering shaft 34. The steering shaft 34 steers the two front wheels 14 by pushing and pulling the two front wheels 14, left and right, by the Ackermann type with rotation thereof.

An accelerator pedal (not shown) is provided on the floor on a front right of the driver's seat 51. The accelerator pedal is a seesaw type with a substantially V-shaped section that can swing around an axis along the left-right direction of the vehicle. For the accelerator pedal, forward travel is instructed by depressing the front side, and the larger a depressing amount becomes, the higher a vehicle speed becomes in the forward travel. On the other hand, for the accelerator pedal, backward travel is instructed by depressing the rear side, and the larger the depressing amount becomes, the higher the vehicle speed becomes in the backward travel.

Figure 5:
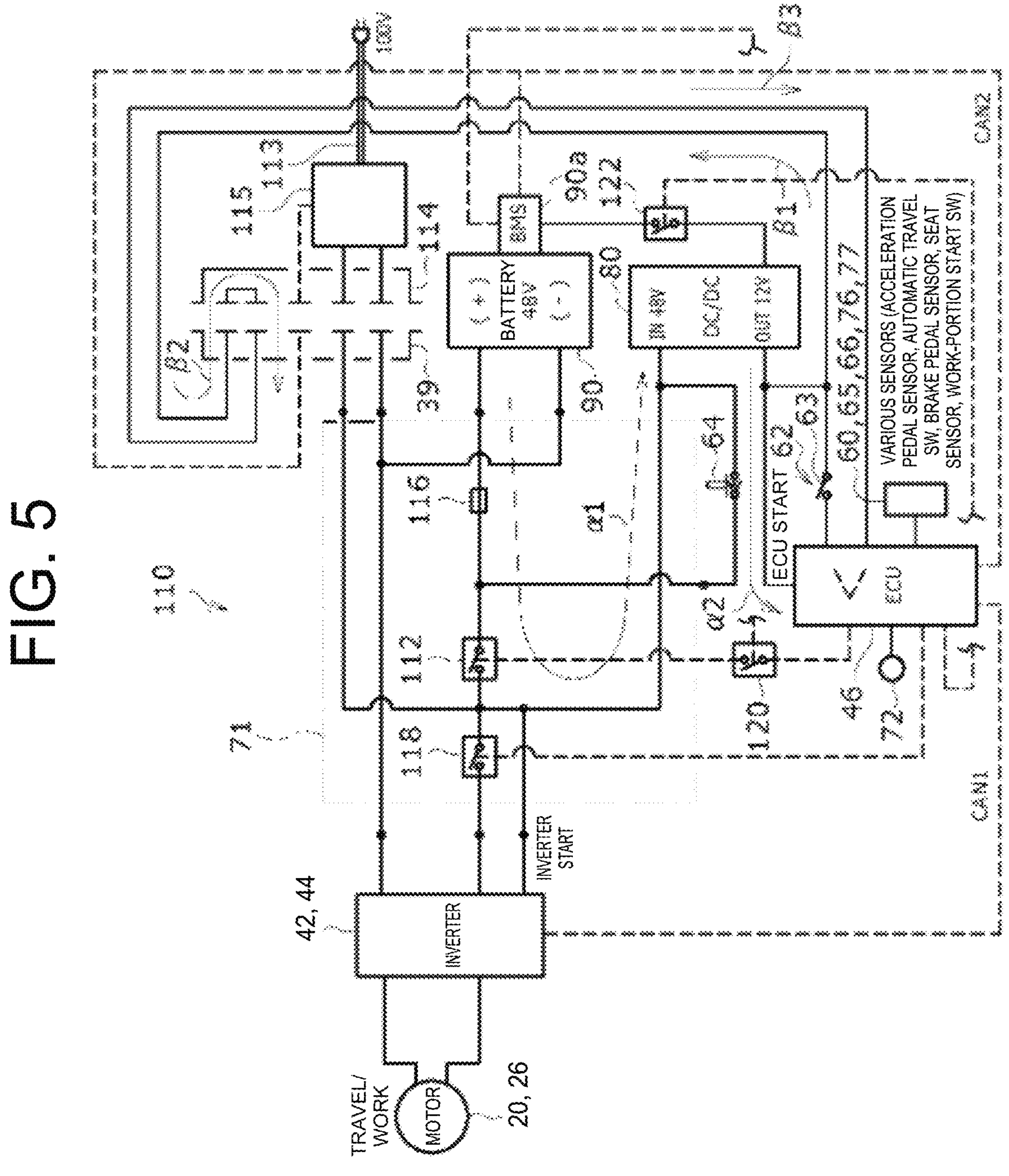
FIG. 5 is a circuit diagram of the control system mounted on the electric work vehicle in FIG. 1.

The accelerator pedal is operated to set a moving direction of the vehicle by a depression side and an operation position of the depressing and to set a vehicle speed from zero to a predetermined value. It is configured such that, when the driver releases the driver's foot from the pedal tread, the accelerator pedal is maintained at a vehicle-speed zero position by a return spring, not shown, which is mechanically connected to the accelerator pedal. The depression side and the operation position of the accelerator pedal are detected by the accelerator pedal sensor 60 (FIG. 5). The accelerator pedal sensor 60 corresponds to a traveling instruction sensor. A detection signal of the accelerator pedal sensor 60 is transmitted to the control device 46. The control device 46 controls a rotation direction and a rotation speed of the traveling motor 20 on the basis of the operation side and the operation position of the accelerator pedal.

The accelerator pedal is not limited to a seesaw type but can be a two-pedal type with different pedals for a forward travel and a backward travel. Alternatively, the accelerator pedal may be a single pedal common to the forward and backward travels, and the vehicle may be provided with a forward/backward switching operation-tool for instructing switching between the forward and backward travels.

The steering column 36 covers the lower side of the steering shaft 34. Specifically, the steering column 36 includes two side plate portions 36*a*, left and right, that rise from the upper surface of the front portion 52*a* of the support member 52, and a rear-end plate portion 36*b* that connects the rear ends of the two side plate portions 36*a* and rises from the upper surface of the front portion 52*a*. The rear-end plate portion 36*b* is inclined upward to the rear. On the upper end of the rear-end plate portion 36*b*, a steering panel 37, which is a plate portion having a substantially rectangular shape inclined upward to the front is provided. On the upper end of the steering panel 37, an upper-end plate portion 38 inclined to the lower side as it goes toward the front is provided. On the upper-end plate portion 38, a charging port 39 capable of connecting a charging connector of a charging cable connected to an external power-feed facility is provided. The charging port 39 may be provided anywhere as long as it is in the vicinity of a junction box 71, which will be described later, such as the side plate portion 36*a*.

On the steering panel 37, a cylinder portion 40 protruding diagonally upward to the rear side from the center of the lower end part is provided. The upper end part of the steering shaft protrudes from the upper-end plate portion of the cylinder portion 40. On the steering panel 37, an operation switch group 62 (FIG. 4), described later, is provided.

The traveling motor 20, together with a power transmission unit 22, is supported between the left and right rear wheels 16 on the lower side of the rear-end portion of the vehicle-body frame 12. A motor case of the traveling motor 20 is fixed to a unit case of the power transmission unit 22, whereby the power transmission unit 22 and the traveling motor 20 are integrated. In this state, a rotation shaft of the traveling motor 20 is disposed along the left-right direction. The traveling motor 20 is, for example, a 3-phase motor. The power transmission unit 22 includes a reduction gear mechanism and a differential mechanism in the unit case, reduces power of the traveling motor 20 and transmits the power to left and right axles 24 (FIG. 2) connected to the left and right rear wheels 16. The traveling motor 20 and the power transmission unit 22 are disposed under the driver's seat 51. The traveling inverter 42 (FIG. 3), described later, is also disposed under the driver's seat 51. As a result, a front-back weight balance can be improved in a configuration where the battery 90 is mounted on the front side of the vehicle 10.

As shown in FIG. 5, which will be described later, to the traveling motor 20, the battery 90 is connected via the traveling inverter 42 and a main contactor 112 as a main switch installed in the junction box (J/B) 71, and power from the battery 90 is supplied to the traveling motor 20. The main contactor 112 is controlled by the control device 46 described later, whereby it switches electrical connection and disconnection between the battery 90 and the traveling inverter 42 (traveling motor 20). The main switch in the junction box (J/B) 71 may be a relay. As will be explained in more detail later, the battery 90 is fixed to the upper side of the vehicle-body frame 12 in a state covered by the bonnet 91 on the front side of the driver's seat 51.

The control device 46 controls a connection state of the main contactor 112 and the traveling inverter 42. The power of the traveling motor 20 is reduced by the reduction gear mechanism in the power transmission unit 22, and the reduced power is differentially transmitted to the left and right axles 24 by the differential mechanism to drive the left and right rear wheels 16 connected to the left and right axles 24. As a result, the vehicle 10 travels.

The lawn mowing device 18 is supported on the lower side of an intermediate portion in the front-back direction of the vehicle-body frame 12. As a result, the lawn mowing device 18 is disposed between the front wheels 14 and the rear wheels 16 in the front-back direction. The lawn mowing device 18 includes three blades 18*a* that are rotary cutter disposed inside a mower deck 19, which is a cover. In FIG. 2, a circular trajectory of movement of a leading end of each of the lawn-mowing blades 18*a* is indicated by one-dotted chain lines a1, a2, and a3. Upper sides of the lawn-mowing blades 18*a* are covered by the mower deck 19. Each of the lawn-mowing blades 18*a* has a plurality of blade elements that rotate around an axis directed in the vertical direction (paper front-rear direction of FIG. 2). As a result, the blade elements rotate and can mow a lawn by cutting the lawn. To each of the three lawn-mowing blades 18*a*, a corresponding one of the deck motors 26 in the three deck motors 26 is connected. To each of the deck motors 26, the battery 90 is connected via the deck inverter 44 (FIG. 3) for the corresponding deck motor 26, and power is supplied from the battery 90 to the deck motor 26. Each of the deck motors 26 is a 3-phase motor, for example.

The lawn mowing device may be configured to include, as a rotary lawn mowing tool, a lawn mowing reel in which a spiral blade is disposed on a rotation axis parallel to a ground surface, for example, having a function of mowing a lawn or the like, and driven by a deck motor.

Figure 4:
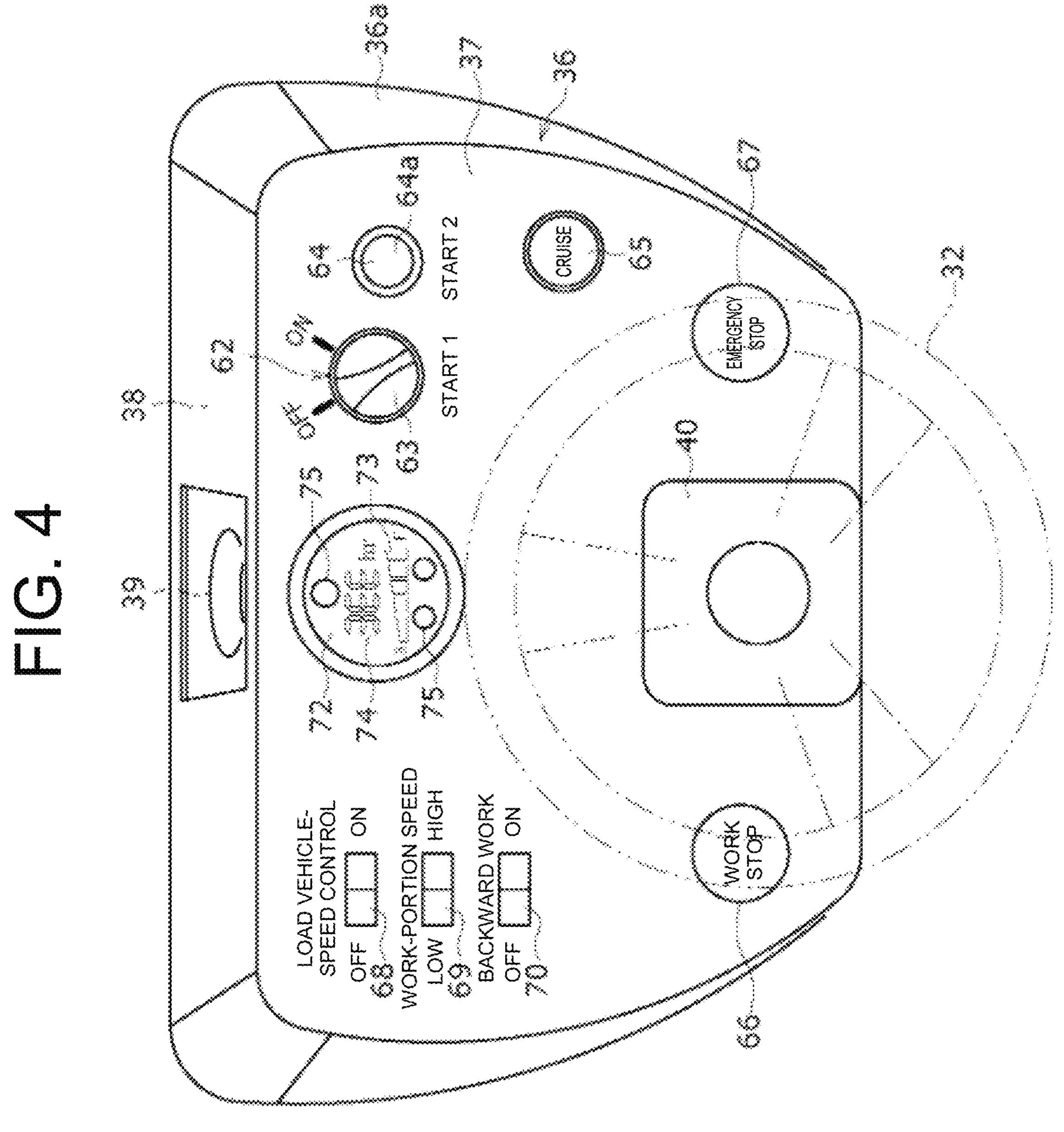
FIG. 4 is a diagram of an operation switch group on an upper part of a steering column viewed from above in the electric work vehicle shown in FIG. 1.

FIG. 4 is a diagram of the operation switch group 62 on the upper part of steering column 36 in the vehicle 10, viewed from above the vehicle. FIG. 5 is a circuit diagram of the control system 110 mounted on the vehicle 10. The operation switch group 62 is provided on the steering panel 37 of the steering column 36. The operation switch group 62 has a first start switch 63 and a second start switch 64 used to start the control system 110, a cruise switch 65, a working start switch 66, and an emergency stop switch 67. The first start switch 63 corresponds to an operation switch. The operation switch group 62 further has a load vehicle-speed control switch 68, a working speed select switch 69, and a backward-work permission switch 70. In addition, a circular indicator 72 is provided on an upper part of a center part in the left-right direction of the steering panel 37.

The first start switch 63 has a knob portion and is a two-position type switch capable of a switching operation, that is, capable of an energization operation between on (energized position) and off (shut-off position) by being manually twisted. The second start switch 64 is a push switch capable of the switching operation between ON (energized position) and OFF (shut-off position), that is, capable of the energization operation, and is turned on by pressing down an operation portion 64*a* and is turned off by being returned upward by an internal spring force. Since the second start switch 64 does not have a function of self-retaining the ON state (energized position), the driver needs to manually keep the operation portion 64*a* pressed down when the driver wants to maintain the ON state.

When the control system 110 is to be started during traveling, the second start switch 64 is turned on after the first start switch 63 is turned on. On the other hand, when the battery 90 is to be charged from an external charging facility, only the second start switch 64 is turned on and the first start switch 63 is not turned on. As shown in FIG. 5, by turning on the second start switch 64, a voltage of the high-voltage battery 90, which holds a voltage for feeding power to various motors (such as 48 V) is input into the DC-DC converter 80, which is stepped down to the voltage for control signals (such as 12 V). An output-side terminal of the DC-DC converter 80 is connected to a power-supply terminal of the control device 46, and the output voltage generated by the DC-DC converter 80 starts the control device 46. Here, the control device 46 turns on the main contactor 112 connected between the battery 90 and the traveling motor 20, that is, it is closed, when the second start switch 64 is turned on, and the first start switch 63 is in the ON state, and even after the second start switch 64 is turned off, the ON state of the main contactor 112 is maintained, the secondary side of the main contactor 112 is brought into a power-feed state, and the high-voltage power-feed to the input port of the DC-DC converter 80 continues. This completes the start of the control device 46 and the inverters 42 and 44, and the battery 90 provided in the vehicle can be only a high-voltage battery such as 48 V, which eliminates the need to provide a low-voltage battery such as 12 V in the bonnet for starting the control device 46 other than the high-voltage battery, and the limited space in the bonnet can be used for increasing a capacity of the battery 90. This will be explained in more detail later.

The cruise switch 65 is provided to instruct execution of a cruise mode by the turning-on operation. The cruise mode is such a mode that the vehicle speed set at the accelerator pedal position when the cruise switch 65 is turned on is stored, and the rotation speed of the traveling motor 20 is controlled so that the traveling of the vehicle at that vehicle speed is maintained without operating the accelerator pedal.

The working start switch 66 is a push-type switch provided to instruct switching between start and stop of the deck motor 26. The working start switch 66 is turned off and locked by pressing-down of the operation portion from the ON state. By twisting the operation portion in a predetermined direction while giving a force in a pressing-down direction from the OFF state, the state is switched to the ON state and is locked. When switching from ON to OFF, there is no need to twist the operation portion, but it is unlocked only by pressing it down, and the operation portion returns to the OFF position by the internal spring force, resulting in the OFF state. As a result, if the lawn mowing device 18 needs to be turned off in an emergency, it can be quickly switched from the ON state to the OFF state only by a simple pressing-down action of the operation portion, which leads to improvement of safety of the vehicle.

The emergency stop switch 67 is provided for emergency stop of both the traveling motor 20 and the deck motor 26 by the pressing-down operation, which is the ON operation. The configuration of the emergency stop switch 67 is similar to that of the working start switch 66, except that the ON position and the OFF position of the emergency stop switch 67 are opposite to the ON position and the OFF position of the working start switch 66. When switching the emergency stop switch 67 from OFF to ON, there is no need to twist the operation portion, but only by tapping it with a first or a palm of the hand and by pressing it down, the power supply to the traveling motor 20 and the deck motor 26 can be quickly shut off so as to stop them, respectively, and unpredictable circumstances can be avoided.

The load vehicle-speed control switch 68 is a rocker-type switch and is provided to switch between an input for the load vehicle-speed control, that is, an execution state and shut-off, that is, a deactivated state. The load vehicle-speed control controls the traveling motor 20 so that the vehicle speed is automatically controlled in accordance with the load of the deck motor 26. For example, if a high load of the deck motor 26 is detected, the traveling motor 20 is controlled to reduce the vehicle speed in accordance with the detected load. On the other hand, if a low load of the deck motor 26 is detected, the traveling motor 20 is controlled to increase the vehicle speed in accordance with the detected load.

The working speed select switch 69 is also a rocker-type switch and is provided to switch the speed of the deck motor 26 in two stages, that is, a predetermined speed on a high speed side and a predetermined speed on a low speed side.

The backward-work permission switch 70 is provided to switch between an input for the backward work permission, that is, permitting the backward work to drive the lawn mowing device 18 while traveling backward and shut-off, that is, prohibiting the backward work. If the prohibition of the backward work is instructed, the control device 46 forcibly stops the drive of the lawn mowing device 18 during the backward travel of the vehicle by switching to the shut-off by operating the backward-work permission switch 70. If the permission of the backward work is instructed, the control device 46 invalidates the forced stop of the lawn mowing device 18 during the backward travel of the vehicle by switching to the input by operating the backward-work permission switch 70. As a result, the driver can perform the work while moving backward in a state where a safe situation is confirmed, whereby work efficiency can be improved.

The indicator 72 has a remaining-charge display portion 73 and a cumulative start-time display portion 74. The remaining-charge display portion 73 indicates an allowable lower limit and an allowable upper limit of the residual charge of the battery 90 by E and F, respectively, and indicates that the residual charge is proper by lighting display located between E and F. In addition, as the lighting display gets closer to E, the driver can recognize that a traveling distance to insufficient charge is short.

The cumulative start-time display portion 74 displays the cumulative start time of the vehicle after the shipment of the vehicle 10 from a manufacturing factory. On the indicator 72, a plurality of lamps that display the system start or that a traveling action is capable by lighting up are also provided. In FIG. 4, the charging port 39 in a charging start state where an opening is exposed is shown, but in a case other than the charging, the charging port 39 is detachably covered by a lid that can be closed liquid-tightly.

As shown in FIG. 5, the control system 110 includes the aforementioned operation switch group 62, the accelerator pedal sensor the brake pedal sensor 76, and the seat sensor 77. The control system 110 further includes the traveling motor 20 and the traveling inverter 42, the three deck motors 26 and the deck inverter 44, the battery 90, the charging port 39, the DC-DC converter 80, and the control device 46. Into the control device 46, a switching signal or a detection signal is input from the operation switch group 62, the accelerator pedal sensor 60, the brake pedal sensor 76, and the seat sensor 77. To the input port of the DC-DC converter 80, the primary side and the secondary side of the main contactor 112 are connected, respectively, but the second start switch 64 is interposed in a connection line on the primary side. To the secondary side of the main contactor 112, the input side of the DC-DC converter 80 is directly connected. To the output-side terminal of the DC-DC converter 80, a power-supply terminal of the control device 46 is connected. Moreover, the first start switch 63 is interposed and connected between the output-side terminal of the DC-DC converter 80 and the input terminal of the control device 46. The DC-DC converter 80 steps down the voltage input from the battery 90 via the second start switch 64 or the main contactor 112 to 12 V and outputs the voltage to a power-supply port of the control device 46 as indicated by arrows a1 and a2 in FIG. 5. In FIG. 5, only the first start switch 63, the second start switch 64, the cruise switch 65, and the working start switch 66 are shown among the operation switch group 62, but switching signals of the other switches in the operation switch group 62 are also input to the control device 46. Moreover, the second start switch 64 inputs the high voltage from the battery 90 to the DC-DC converter 80 by its ON (to the energized position) operation, even in the OFF state (power-feeding stopped) state of the main contactor 112, and by causing the low voltage output from the DC-DC converter 80 to be input into the power-supply terminal of the control device 46, the control device 46 is started by the output voltage.

In FIG. 5, the traveling inverter 42 as well as the deck inverter 44 and the traveling motor 20 as well as the deck motor 26 are shown as one element, respectively, but actually, the traveling inverter 42 and the three deck inverters 44 are connected in parallel on the power output side of junction box 71, and the traveling motor 20 and the deck motor 26 are connected to the traveling inverter 42 and the deck inverter 44, respectively.

The brake pedal sensor 76 detects that the brake pedal (not shown) disposed on the floor on the front left of the driver's seat 51 was depressed and operated. When a depressing detection signal was input into the control device 46 from the brake pedal sensor 76, the control device 46 cancels the aforementioned cruise mode and feeds power to the traveling motor 20 in a direction for generating a reverse torque. In addition, the brake pedal is mechanically connected via a link mechanism, not shown, so as to move an operating arm (not shown) of the brake device internally provided in the power transmission unit 22 to a brake operation position. Thus, the rotations of the rear wheels 16 are strongly stopped with both electrical and mechanical braking by depressing the brake pedal.

The seat sensor 77 detects that the driver is seated in the driver's seat 51. For example, the control device 46 is configured to include an input of a seating detection signal from the seat sensor 77 as a condition for driving the traveling motor 20 and the deck motor 26.

The traveling inverter 42 drives the traveling motor 20. The traveling inverter 42 has, for example, a traveling inverter circuit including three arms each having two switching elements electrically connected in series, and a traveling-inverter control device that controls the traveling inverter circuit. The traveling inverter 42 converts DC power input from the battery 90 into AC power and outputs the voltage to the traveling motor 20.

An operation of the traveling inverter 42 is controlled by the control device 46. As a result, the traveling motor 20 is controlled by the control device 46 via the traveling inverter 42, and power is supplied to the traveling motor 20 from the battery 90 via the traveling inverter 42. In FIG. 5, bold lines indicate the main contactor 112 and power supply lines with a high voltage such as 48 V via a sub contactor 118 described below, while thin lines indicate signal lines and power supply lines with a low voltage such as 12 V via only the main contactor 112. Although not shown, to the traveling-inverter control device of the traveling inverter 42, a detection value of a rotation number n (sec-1), which is a rotation speed of the traveling motor 20 is input from a motor speed sensor (not shown) provided in the traveling motor 20. The motor speed sensor detects the rotation number of the traveling motor 20. Detection values of the rotation numbers of the motor speed sensor are output to the control device 46.

Each of the deck inverters 44 drives the corresponding deck motor 26. Similarly, to the traveling inverter circuit and the traveling-inverter control device of the traveling inverter 42, each of the deck inverters 44 also has a deck inverter circuit and a deck-inverter control device that controls the deck inverter circuit. Each of the deck motors 26 is controlled by the control device 46 via the deck inverter 44, and to the deck motor 26, power is supplied from the battery 90 via the deck inverter 44. Thus, each of the lawn-mowing blades 18*a* is rotated and driven by the corresponding deck motor 26, and each of the deck motors 26 is driven so as to maintain a predetermined target rotation number set by the working speed select switch 69 described above. The lawn cut by the lawn mowing device 18 is discharged to one side in the left-right direction of the vehicle 10 through a discharge duct provided on the one side in the left-right direction of the mower deck 19.

Furthermore, to the deck-inverter control device of each of the deck inverters 44, a detection value of the rotation number n (sec-1), which is a rotation speed of the deck motor 26, is input from a deck-motor speed sensor (not shown). Each of the deck-motor speed sensors detects the rotation number, which is the rotation speed of the corresponding deck motor 26. A detection value of the rotation number of the deck-motor speed sensor is output to the control device 46 via the corresponding deck inverter 44.

The control device 46 includes a calculation portion such as a CPU and a storage portion such as a memory and is configured of, for example, a microcomputer.

The charging port 39 is connected to the battery 90 via the main contactor 112 in the junction box 71. The charging port 39 can be connected to an external power-feed facility via a charger 115. As a result, in a state where a charging connector 114 of a charging cable 113 connected to an external charging facility is connected to the charging port 39, the battery 90 can be charged from the external charging facility via the main contactor 112. At this time, a battery control device (BMS) 90*a* is fixed to an upper end of the battery 90, and when the battery control device 90*a* receives a signal indicating that the charging connector 114 is connected to the charging port 39, the battery control device 90*a* and the charger 115 provided on the charging cable 113 communicate, and if predetermined charging conditions are met, the battery control device 90*a* causes the external charging facility to start charging of the battery 90 via the charger 115.

Moreover, the junction box 71 includes a fuse 116 connected between the battery 90 and the main contactor 112 and a sub contactor 118 connected between the main contactor 112 and the inverters 42, 44. When the main contactor 112 is turned on by the system start described above, low-voltage power and signals are supplied to the inverter. As a result, when the control device 46 senses that the inverter was started, the control device 46 turns on the sub contactor 118. Moreover, the control system 110 includes a battery-malfunction response relay 120 and a battery start relay 122. The battery-malfunction response relay 120 is provided in the middle of the signal line that outputs control signals from the control device 46 to the main contactor 112 and is ON when the battery 90 is normal. The battery-malfunction response relay 120 is controlled by the battery control device 90*a* to switch between open and close. When the battery control device 90*a* detects malfunction of the battery 90, it outputs a battery-malfunction detection signal and turns off the battery-malfunction response relay 120, whereby the control signal from the control device 46 is shut off, and the main contactor 112 is turned off.

The battery start relay 122 is connected between the power-supply terminal of the battery control device 90*a* and the output-side terminal of the DC-DC converter 80. In a case where the charging connector 114 of the charging cable 113 is connected to the charging port 39 during charging, if the control device 46 is started when the second start switch 64 is turned on, the control device 46 turns on the battery start relay 122 and starts the battery control device 90*a*. As a result, the battery control device 90*a* can communicate with the charger 115 via CAN and charging of the battery 90 from the external charging facility is started when the predetermined conditions are met.

It may be so configured that the battery-malfunction response relay 120 and the battery start relay 122 are included in a single relay unit (not shown), and the relay unit is fixed to a rear side surface of a second plate 88 made of metal that divides a space in the bonnet, which will be described later, together with the control device 46. This allows the relay unit to dissipate heat more easily, whereby a temperature rise of the relay unit can be suppressed.

Figure 6:
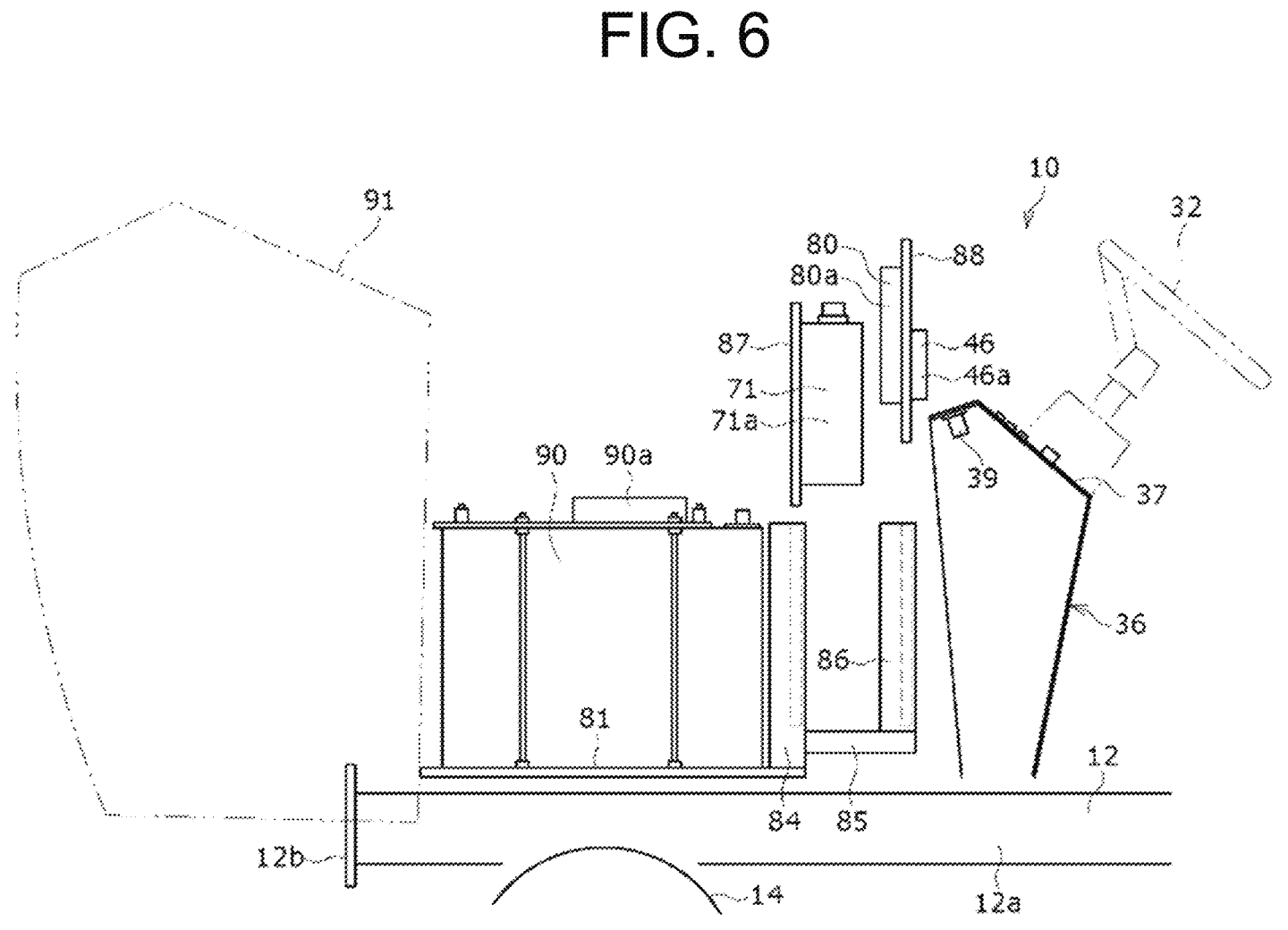
Figure 7:
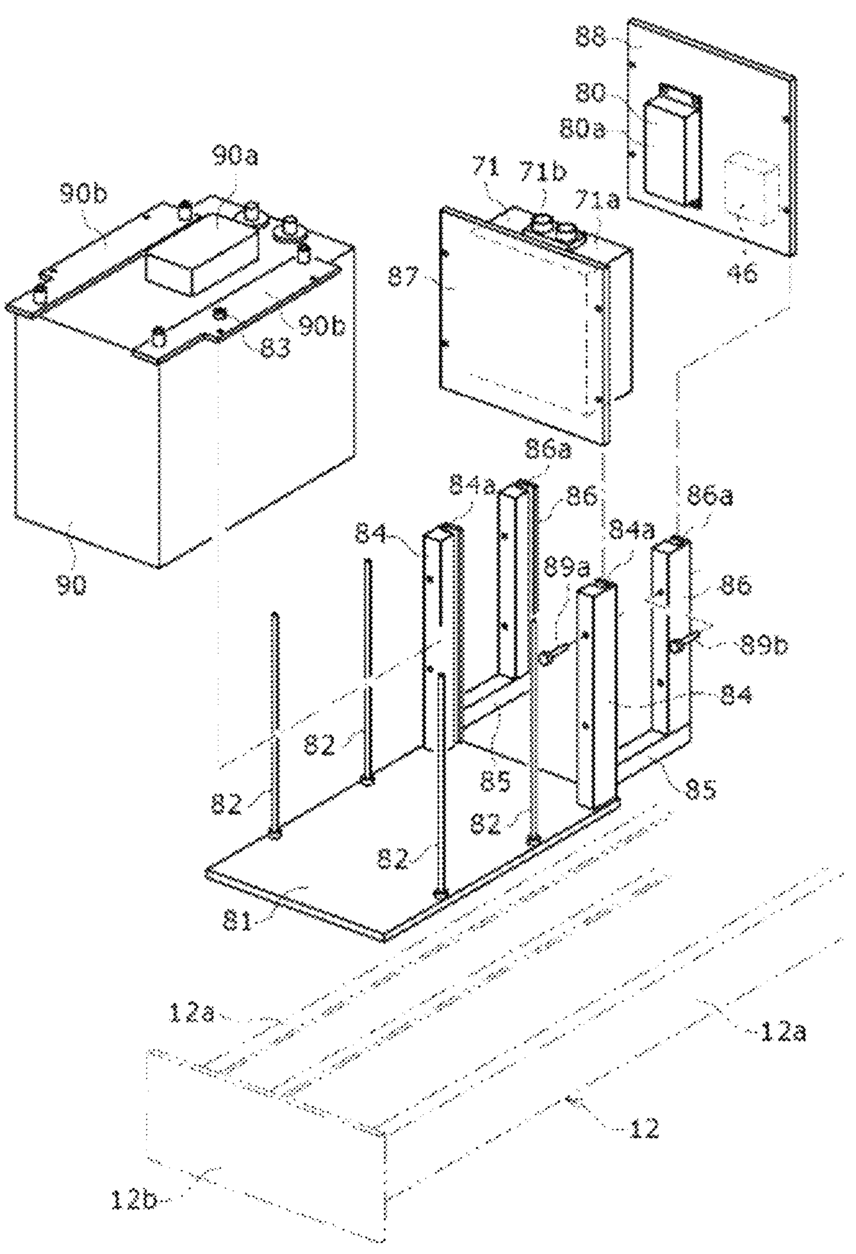
FIG. 7 is a perspective view illustrating a state immediately before a battery mount, a battery, the junction box, and the DC-DC converter are mounted on the front part of a vehicle-body frame of the electric work vehicle in FIG. 1.

Subsequently, a disposition structure of each of the battery 90, the junction box 71, and the inverters 42 and 44 in the vehicle 10 will be explained by using FIGS. 6 to 8. FIG. 6 is a diagram corresponding to a front part of FIG. 1 illustrating a state where the bonnet 91 is opened, and the junction box 71 and the DC-DC converter 80 are taken out. FIG. 7 is a perspective view illustrating a state immediately before a battery mount 81, the battery 90, the junction box 71, and the DC-DC converter 80 are mounted on the front part of the vehicle-body frame 12 of the vehicle.

First, with reference to FIG. 1, the battery 90 is provided on the front side of the steering column 36 and disposed from the front side of the space inside the bonnet covered by the bonnet 91 to an intermediate part in the front-back direction. Specifically, the bonnet 91 is constituted by two side plate portions, left and right, a top plate portion connecting the upper ends of the two side plate portions, and a front plate portion that closes an opening formed by the top plate portion and the front ends of the two side plate portions. A lower end part on the front side of the bonnet 91 is mounted capable of swing along an axis in the left-right direction with respect to the front end part of the vehicle-body frame 12. As a result, as shown in FIG. 6, in a state where the bonnet 91 is moved to stand on the front side, the space having been covered by the bonnet 91 and the equipment or components such as the battery 90 disposed in that space can be opened to the outside.

The battery 90 is fixed to the vehicle-body frame 12 via the battery mount 81. Specifically, with reference to FIG. 2, a rectangular flat-plate shaped battery mount 81 is fixed to upper sides of the both side frames 12*a*, extending across the both side frames 12*a*. As shown in FIG. 7, two shaft portions 82 in which threaded portions are formed at least on upper end portions are fixed separately in front and back by penetrating the battery mount 81 from below to above and standing upright on the upper side on each of the both left and right end portions of the battery mount 81. A mounting plate 90*b* extending in the front-back direction and protruding outward in a lateral direction is fixed to the both left and right end portions of the upper end of the battery 90. The battery 90 is disposed on the upper surface of the battery mount 81 so that the shaft portion 82 penetrates from below through holes formed in front and back of each of the mounting plates 90*b*. In this state, the battery 90 is fixed to the battery mount 81 by a nut 83 fixed to the threaded portion on the upper end of the shaft portion 82. FIG. 7 shows only the nut 83 coupled with the one shaft portion 82, but the same applies to the nuts coupled with the other shaft portions 82.

In addition, a pair of first columns 84 are fixed to end parts on the rear side in the both left and right end parts of the battery mount 81 so as to stand upright, and a second column 86 standing upright is fixed via a connecting portion 85 extending in the front-back direction on a lower end part of the rear surface of each of the first columns 84. As a result, the pair of first columns 84 and the pair of second columns 86 are fixed to the rear side of the battery mount 81. Moreover, the two first columns 84 are fixed on the upper side of the vehicle-body frame 12, separated from each other to left and right. The two second columns 86 are fixed on the upper side of the vehicle-body frame 12 on the rear side of the two first columns 84, separated from each other to left and right.

In this example, the second column 86 and the connecting portion 85 are formed of a single member substantially having an L-shape as a whole. On the other hand, the second column and the connecting portion may be formed of separate members and may have substantially an L-shape as a whole by being fixed integrally by fastener such as bolt and nut.

Each of the first columns 84 is made of metal such as steel, and it has a first groove 84*a* having a rectangular section and opened toward a center in the left-right direction formed along an entire length in the up-down direction in an inner side surface directed to a center in the left-right direction thereof. A width of the first groove 84*a* corresponds to a thickness of the first plate 87. Each of the first columns 84 is provided at the same position with respect to the front-back direction, and the first groove 84*a* of each of the first columns 84 is also provided at the same position with respect to the front-back direction.

Each of the second columns 86 is made of metal such as steel, and it has a second groove 86*a* formed along an entire length in the up-down direction in an inner side surface directed to a center in the left-right direction thereof, similarly to the first column. A width of the second groove 86*a* corresponds to a thickness of the second plate 88. Each of the second columns 86 is provided at the same position with respect to the front-back direction, and the second groove 86*a* of each of the second columns 86 is also provided at the same position with respect to the front-back direction.

Both left and right ends of the first plate 87 are inserted into the first groove 84*a* of each of the first columns 84. The first plate 87 has a flat plate shape, for example. In this state, bolts 89*a* which penetrate holes in the front-back direction at a plurality of positions in the up-down direction of the first column 84 also penetrate holes formed in both left and right ends of the first plate 87 in the first groove 84*a*. The both left and right ends of the first plate 87 are fixed to each of the first columns 84 by nuts (not shown) fixed to distal ends of the bolts 89*a* which penetrate the first column 84. In FIG. 7, only the bolt 89*a* penetrating one hole in one first column 84 is shown, but the same applies to the bolts penetrating the other first columns 84 or other holes.

As a result, the first plate 87 is disposed on the rear side of the battery 90 in the space inside the bonnet, divides a part of the space inside the bonnet into front and rear, and stands upright in space inside the bonnet. The first plate 87 is formed of metal such as iron, an aluminum alloy and the like.

The battery 90 is disposed on the front of the front side surface of the first plate 87, and the junction box 71 is attached to the rear side surface of the first plate 87 by being fixed thereto. The junction box 71 accommodates electrical components such as the main contactor 112, busbars, and fuses 116 in a box-like case 71*a* formed of metal such as iron, an aluminum alloy and the like. Moreover, on an upper end of the case 71*a*, a connector 71*b* for connecting wiring to electrical components in the case 71*a* from outside is provided. Instead of the connector 71*b*, wiring can be connected to the electric components inside through an opening formed in an upper end of the case 71*a*. The case 71*a* is disposed vertically in the space inside the bonnet so that a length in the front-back direction becomes smaller than a length in the up-down direction and a length in the left-right direction. Heat generated from the various electrical components is dissipated from the case 71*a* and the first plate 87.

Both left and right ends of the second plate 88 are inserted into the second groove 86*a* of each of the second columns 86. The second plate 88 has a flat plate shape, for example. In this state, bolts 89*b* which penetrate holes in the front-back direction at a plurality of positions in the up-down direction of the second column 86 also penetrate holes formed in both left and right ends of the second plate 88 in the second groove 86*a*. The both left and right ends of the second plate 88 are fixed to each of the second columns 86 by nuts (not shown) fixed to distal ends of the bolts 89*b* which penetrate the second columns 86. In FIG. 7, only the bolt 89*b* penetrating one hole in one second column 86 is shown, but the same applies to the bolts penetrating the other second columns 86 or other holes.

As a result, the second plate 88 divides a part of the space inside the bonnet on the rear side of the first plate 87 in the space inside the bonnet into front and rear and stands upright in the space inside the bonnet. The second plate 88 is also formed of metal similarly to the first plate 87.

The DC-DC converter 80 is attached to the front side surface of the second plate 88. The DC-DC converter 80 has a converter circuit accommodated in a case 80*a*. The case 80*a* has a box shape and is formed of metal such as iron, an aluminum alloy and the like. In the case 80*a*, connectors or openings for connecting wiring are formed similarly to the junction box 71. The control device 46 and heat sinks (not shown) of the DC-DC converter 80 are brought into close contact with an outer surface of the second plate 88.

The control device 46 is attached to the rear side surface of the second plate 88. The control device 46 accommodates a control circuit in a case 46*a*. The case 46*a* also has a box shape formed of metal similarly to the case 80*a*. In the case 46*a*, connectors or openings for connecting wiring are formed similarly to the DC-DC converter 80 and the junction box 71.

When a maintenance work such as inspection of the junction box 71 and at least either one of the DC-DC converter 80 and the control device 46 is to be performed, as shown in FIG. 6, the driver moves the rear end side of the bonnet 91 to the upper front side and opens the inside of the bonnet 91. In this state, by removing the bolts and nuts which fix each of the first columns 84 as well as the first plate 87 and the second columns 86 and the second plate 88, and by pulling out each of the plates 87, 88 upward from each of the columns 84, 86, the junction box 71, the DC-DC converter 80, and the control device 46 can be removed from the vehicle. As a result, the maintenance work can be performed efficiently in a large area with favorable workability. The first plate and the second plate do not have to be configured to be inserted into grooves along the up-down direction of the columns. Even in this case, in a state where the inside of the bonnet 91 is open, the junction box 71, the DC-DC converter 80, and the control device 46 are disposed on the upper side from the lower end of the battery 90 and thus, the maintenance work can be made easier than a case where a target component for the maintenance is disposed on the lower side of the battery 90.

Figure 8:
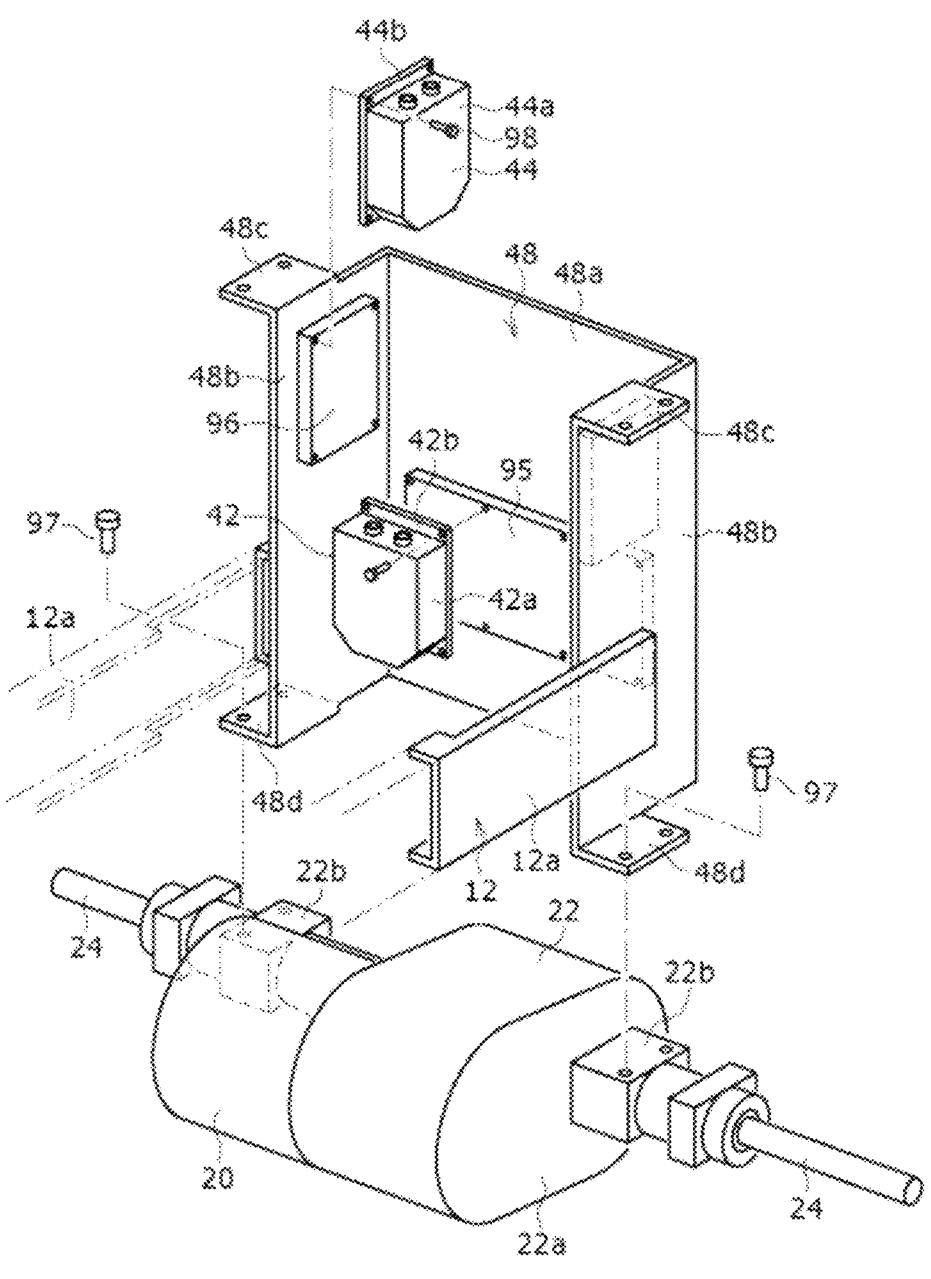
FIG. 8 is a perspective view illustrating a state immediately before an inverter mounting member and the inverter are mounted on an upper side of a power transmission unit of the electric work vehicle in FIG. 1.

FIG. 8 is a perspective view illustrating a state immediately before the inverter mounting member 48 and the inverters 42, 44 are mounted on the upper side of the power transmission unit 22. With reference to FIGS. 1, 3, and 8, in this example, the traveling inverter 42 is disposed below the driver's seat 51, in addition to the traveling motor 20 and the power transmission unit 22. Specifically, the inverter mounting member 48 is stood upright on the upper surface of the power transmission unit 22. The inverter mounting member 48 has a main-body plate portion 48*a* which extends in the left-right direction and in the up-down direction and has a thickness direction facing the front-back direction and two side plate portions 48*b* which extend from the left and right end parts of the main-body plate portion 48*a* to the front side in the front-back direction. On the upper end part and the lower end part of each of the side plate portions 48*b*, an upper flange 48*c* and a lower flange 48*d* extending outward in the left-right direction are formed.

The inverter mounting member 48 is fixed to the rear end parts of the two side frames 12*a*, left and right, on the vehicle-body frame 12 so as to be sandwiched in the left-right direction. As a result, the inverter mounting member 48 serves as a strength member as the rear end part of the vehicle-body frame 12 and also functions as a suspension member for the power transmission unit 22 in the vehicle-body frame 12.

The lower flange 48*d* of the inverter mounting member 48 is fixed by screw connection using a screw 97 to the upper end of a mounting plate 22*b* having a substantially rectangular cylindrical shape provided on both left and right end parts of the unit case 22*a* of the power transmission unit 22. The upper flange 48*c* of the inverter mounting member 48 is fixed by the screw connection to the support member 52 with the driver's seat 51 provided on the upper side. As a result, the driver's seat 51 is fixed indirectly to the upper end part of the inverter mounting member 48 via the support member 52. The driver's seat 51 may be fixed directly to the upper end part of the inverter mounting member 48.

The traveling inverter 42 accommodates the traveling inverter circuit and the traveling-inverter control device in a the first case 42*a*. The deck inverter 44 accommodates the deck inverter circuit and the deck-inverter control device in a second case 44*a*. At least either one of the inverters, that is, the traveling inverter 42 and the deck inverter 44, is mounted on the front side surface of the main-body plate portion 48*a* of the inverter mounting member 48. Moreover, either one of the traveling inverter 42 and the deck inverter 44 is mounted on the front side surface of the main-body plate portion 48*a*, and the other is mounted on the inner side surface of the side plate portion 48*b*. At this time, heat sinks 95, 96 made of metal with high heat dissipation characteristics such as an aluminum alloy are interposed between each of the traveling inverter 42 and the deck inverter 44 and the inverter mounting member 48. The heat sinks 95, 96 are brought into contact with heat sinks 42*b*, 44*b* provided on each of the traveling inverter 42 and the deck inverter 44. The heat sinks 95, 96 are fixed to the inverter mounting member 48, and the heat sinks 95, 96 and the heat sinks 42*b*, 44*b* are fixed by screw connection using screws. As a result, the traveling inverter 42 and the deck inverter 44 are disposed below the driver's seat 51. Wind flowing from the front to the rear of the vehicle during traveling is sent into the space enclosed by the inverter mounting member 48 and thus, heat dissipation from the inverter mounting member 48 is promoted. The main-body plate portion 48*a* and the side plate portion 48*b* may have an opening for air ventilation provided as appropriate.

In FIG. 3, the two inverters 42 and 44 are fixed to the lower side of the main-body plate portion 48*a* of the inverter mounting member 48, and the deck inverter 44 is fixed one by one to each of the side plate portions 48*b* of the inverter mounting member 48. On the other hand, not limited to this configuration, the disposition positions of the inverters 42, 44 relative to the inverter mounting member 48 can be changed in accordance with disposition relationship or the like of components around the inverter mounting member 48. For example, the four inverters 42, 44 may be fixed only to an inner side surface of the main-body plate portion 48*a*. In FIG. 8, some of the inverters are not shown.

In the above, the case in which the rear wheels 16 are driven by the traveling motor 20 was described, but it may be such a configuration that the front wheels are driven by the traveling motor or that both the front wheels and the rear wheels are driven by the traveling motor.

Figure 9:
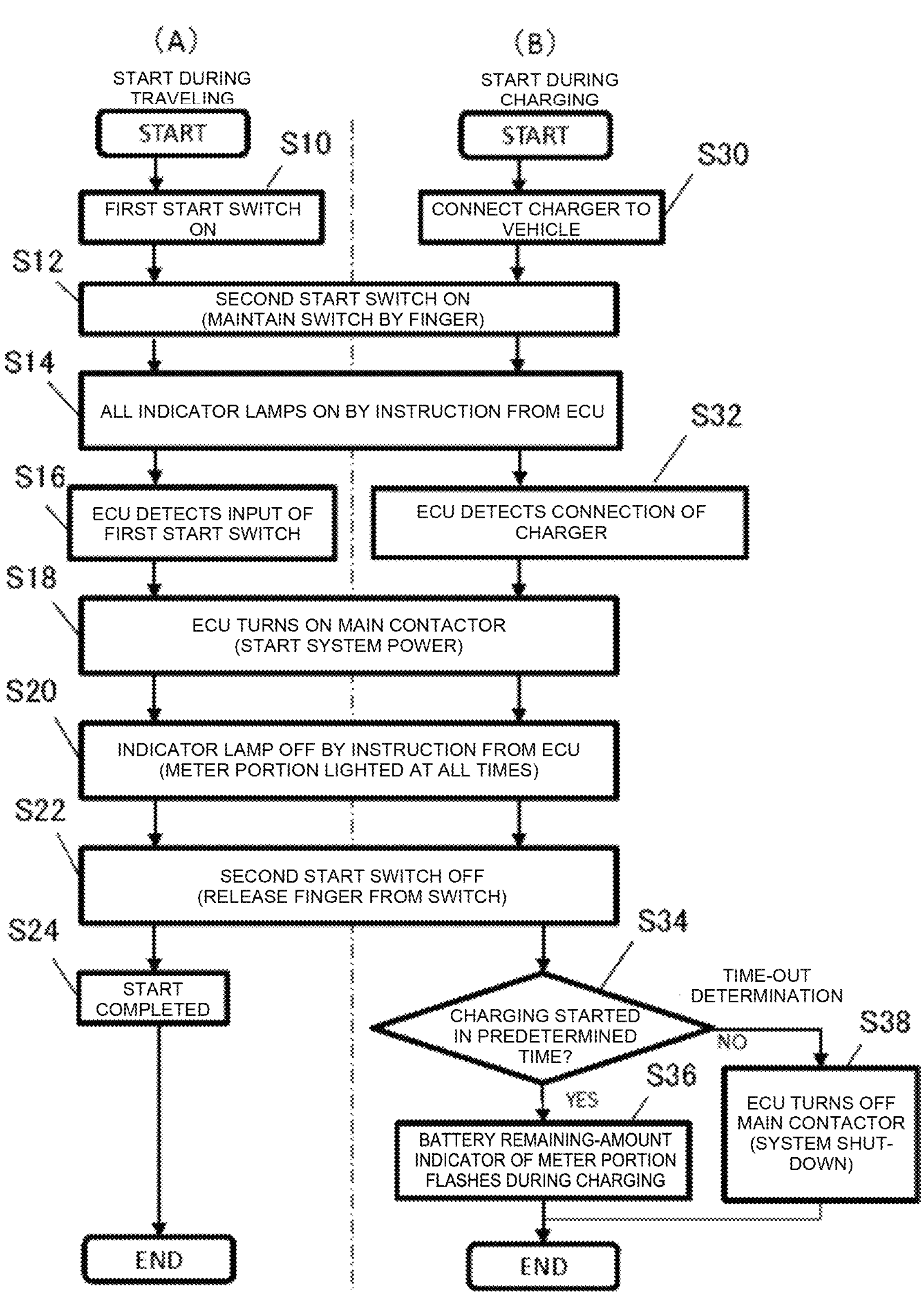
FIG. 9 is a flowchart illustrating a start control method (A) during traveling and a start control method (B) during charging in the control system of the embodiment.

FIG. 9 is a flowchart illustrating a start control method (A) during traveling and a start control method (B) during charging in the control system 110 of the embodiment. When the control system 110 is to be started during traveling, the driver performs the ON operation of the first start switch 63 (FIG. 4, FIG. 5) at S10 in (A). Subsequently, at S12, the driver performs the ON operation of the second start switch 64 (FIG. 4, FIG. 5) by pressing it down with a finger. At this time, since the second start switch 64 is a push switch that does not self-retain the ON state, the driver keeps the operation portion 64*a* pressed down with the driver's finger.

As the result of the energization of the DC-DC converter 80 with the battery 90 by the ON operation of the second start switch 64, the control device (ECU) 46 (FIG. 5) is started by an output voltage of the DC-DC converter 80, and at S14, all the lamps 75 of the indicator 72 are lighted by an instruction from the control device 46. As a result, normality of the lamps 75 is confirmed.

Subsequently, at S16, the control device 46 detects the input of the first start switch 63, that is, the ON state. As a result, at S18, the control device 46 turns on the main contactor 112, and each of the inverters 42 and 44 is started. In other words, the system power supply is started.

Subsequently, at S20, the lamp 75 of the indicator 72 is turned off by an instruction from the control device 46. At this time, the remaining-charge display portion 73 and the cumulative start-time display portion 74 are displayed as meter portions of the indicator 72 as being lighted at all times.

Subsequently, at S22, the driver confirms a change in the display of the indicator 72 and then, releases the driver's finger from the second start switch 64, turns the second start switch 64 off, completes the start (S24), and ends the start control. Even in this state, the ON state of the main contactor 112 is maintained. As described above, in the configuration of this example, the control device 46 turns on the main contactor 112, when the second start switch 64 is turned on and the first start switch 63 is in the ON state and maintains the ON state of the main contactor 112 even after the second start switch 64 is turned off.

As a result, without providing a low-voltage battery such as 12V, the control device 46 is started, and the power feeding from the battery 90 to the DC-DC converter 80 continues, even after the second start switch 64 is turned off and thus, the start state of the control device 46 operated at a low voltage continues, the ON state of the main contactor 112 also continues, and the power can be fed to the traveling motor 20 and the deck motor 26 any time.

Subsequently, when the control system 110 is to be started in order to charge the battery 90 from an external charging facility, the charger 115 is connected to the vehicle by connecting the charging connector 114 of the charging cable 113 to the charging port 39 of the vehicle at S30 in (B).

Subsequently, the driver turns on the second start switch 64 by pressing it down with the driver's finger at S12 as in (A) without the ON operation of the first start switch 63. Subsequently, as in (A), at S14, the control device 46 (ECU) is started by the output voltage of the DC-DC converter 80, and all the lamps 75 of the indicator 72 are lighted by the instruction from the control device 46.

Subsequently, at S32, the control device 46 detects connection of the charger 115 to the vehicle. At this time, for example, in FIG. 5, since the charging connector 114 is connected to the charging port 39, the current paths as indicated by arrows β1, β2, and β3 are configured, and the output voltage of the DC-DC converter 80 is input from the current path β3 into the terminal indicated by Cl in the control device 46. As a result, the control device 46 can determine the connection between the charging port 39 and the charging connector 114.

After S32 in FIG. 9, at S18, the control device 46 turns on the main contactor 112, and as in (A), at S20, the control device 46 turns off the lamp 75 of the indicator 72, and at S22, the second start switch 64 is turned off by the driver releasing the driver's finger from the second start switch 64. Even in this state, the ON state of the main contactor 112 is maintained. As described above, in the configuration of this example, when the second start switch 64 is turned on, the first start switch 63 is off, and the charger 115 is connected to the charging port 39, the control device 46 turns on the main contactor 112 and maintains the ON state of the main contactor 112 even after the second start switch 64 is turned off. Thus, the current from the charger 115 is supplied to the battery 90 via the primary side from the secondary side of the main contactor 112.

On the other hand, after S22, it is determined whether the charging was successfully started after S34. Specifically, at S34, the control device 46 determines whether the charging was started within a predetermined time since the ON operation of the second start switch 64. If the determination result at S34 is affirmative (YES), the control device 46 flashes the remaining-charge display portion 73, which is the meter portion of the indicator 72, during the charging (S36). As a result, the user can recognize that the charging is currently in progress and can recognize the end of the charging by the end of the flashing display.

On the other hand, if the determination result at S34 is negative (NO), the control device 46 turns off the main contactor 112 (S38) as abnormality occurrence processing, which is processing of timeout determination. As a result, when there is a high possibility of defective charging, safety of the vehicle can be improved. After processing at S36 and S38, the start control is finished.

Figure 10:
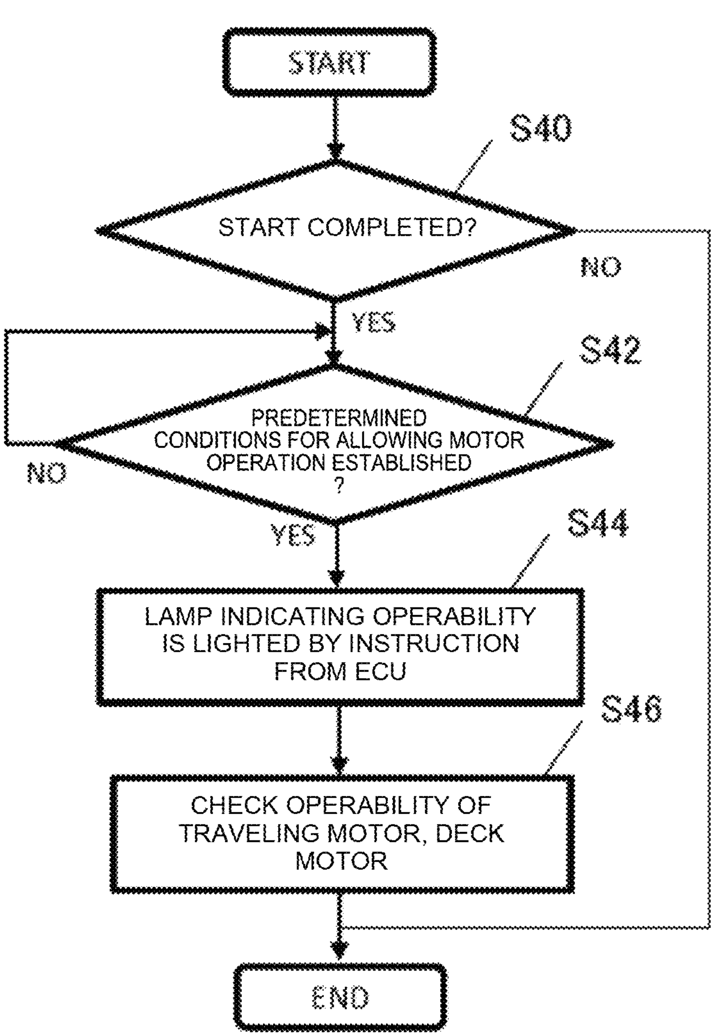
FIG. 10 is a flowchart illustrating a control method to confirm that the traveling motor and a working motor are operable in the control system of the embodiment.

FIG. 10 is a flowchart illustrating a control method of confirming that the traveling motor 20 and the deck motor 26 can operate in the control system 110 of the embodiment. First, at S40, the control device 46 determines whether the start at S24 in FIG. 9 has been completed. If a determination result at S40 is affirmative (YES), it is determined at S42 whether a predetermined condition for allowing the motor operation is satisfied. The predetermined condition for allowing the motor operation is, for example, all of that an angle of an operation position of the accelerator pedal is within a predetermined range, which is considered to be a neutral state, that the brake pedal is depressed and in the ON state, that the seat sensor 77 is in the ON state indicating seating, and that the deck-motor rotation speed sensor is at the 0 position and the rotation of the deck motor 26 is stopped are satisfied.

On the other hand, if the determination result at S40 is negative, the confirmation control is finished. If the determination result at S42 is affirmative (YES), the processing proceeds to S44, while if the determination result is negative (NO), the processing returns to before S42 and repeats the processing.

At S44, all the lamps 75 of the indicator 72 indicating "operable" are turned on by the instruction from the control device 46. At S46, the control device 46 finishes the confirmation control, assuming that the state where the traveling motor 20 and the deck motor 26 are operable has been confirmed. As a result, the corresponding motor becomes operable by the driver's operation of the accelerator pedal, or the operation of the working start switch 66.

Figure 11:
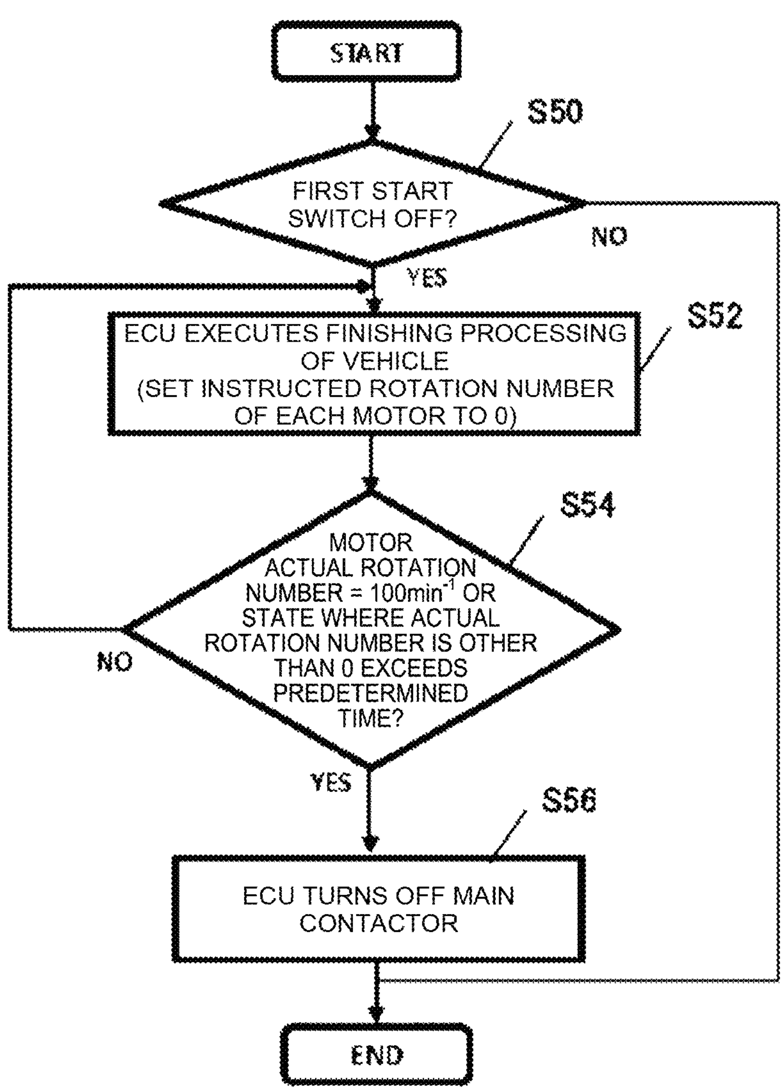
FIG. 11 is a flowchart illustrating an end control method in the control system of the embodiment.

FIG. 11 is a flowchart illustrating an end control method in the control system 110 of the embodiment. First, at S50, the control device 46 determines whether the first start switch 63 was turned off. If the determination result at S50 is affirmative (YES), at S52, the control device 46 executes the predetermined end processing, which includes setting of target rotation numbers of the traveling motor 20 and each of the deck motors 26 to 0. On the other hand, if the determination result at S50 is negative (NO), the end control is finished.

After S52, at S54, it is determined whether the detected actual rotation number of each motor of the traveling motor 20 and each of the deck motors 26 is 100 min-1 or whether the detected actual rotation number of each motor is in a state other than 0, that is, whether a state where it does not become 0 exceeds a predetermined time.

If the determination result at S54 is affirmative (YES), the processing proceeds to S56, the control device 46 turns off the main contactor 112 and stops power feeding from the battery 90 to the traveling motor 20, each deck motor 26, and the control device 46. On the other hand, if the determination result at S54 is negative (NO), the processing returns to before S52 and repeats the processing. When the processing at S56 is finished, the end control is finished.

According to the control system 110 described above, since only the battery 90 with a voltage higher than the voltage input to the control device 46 needs to be mounted as a battery on the vehicle, the mounting of a low-voltage battery on the vehicle becomes unnecessary. At the start of the system, by turning on the second start switch 64 after the ON operation of the first start switch 63, power can be fed from the battery 90 to the control device 46 and the traveling motor 20 even after the OFF operation of the second start switch 64. When the system is stopped, the control device 46 executes the predetermined end processing after the OFF operation of the first start switch 63 and then, it can turn off the main contactor 112 and can stop the power feeding from the battery 90 to the traveling motor 20 and the control device 46. As a result, the system can be stopped safely without providing a low-voltage battery. Thus, a space for the size increase of the other components such as the high-voltage battery 90 can be enlarged, and the labor for battery charging can be reduced.

Moreover, the control system 110 has a deck motor to which power is fed from the battery via the main contactor, and when the first start switch 63 is turned off, the control device 46 executes the predetermined end processing including the setting of the target rotation numbers of the rotation speeds of the traveling motor 20 and the deck motor to 0 and then, it turns off the main contactor 112 and stops the power feeding from the battery 90 to the traveling motor 20, the deck motor 26, and the control device 46. As a result, the vehicle's system can be stopped more safely by the OFF operation of the first start switch 63 without providing a low-voltage battery.

Moreover, the control system 110 includes the charging port 39 that can be connected to an external power-feed facility via the charger 115, which is connected to the battery 90 via the main contactor 112. When the second start switch 64 is turned on, the first start switch 63 is off, and the charger 115 is connected to the charging port 39, the control device 46 turns on the main contactor 112 and maintains the ON state of the main contactor 112 even after the second start switch 64 is turned off. As a result, when the battery 90 is charged from the external power-feed facility, the charging work can be performed while starting the control device 46 by turning on the second start switch 64 and thus, a stable charging work of the battery 90 can be performed easily.

Moreover, in the control system 110, the first start switch 63 is a two-position switch, and the second start switch 64 is a push switch such that the ON state, that is, the state operated to the energized position is not self-retained. As a result, at start of the system, when the driver turns on the second start switch 64, such a state can be prevented that the state continues unintentionally and interferes with other control processing.

Although not shown, as another example of the control system of the embodiment, it may be so configured that the operation portion, which is a single operation portion that mechanically operates ON/OFF states of the first start switch and the second start switch is provided on a back side of the steering panel. For example, the operation portion is of a rotary type that can rotate to four positions within a predetermined angle range, and when the operation portion is at a center position, the first start switch is turned off, and the second start switch is turned on at the maximum rotation angle rotated by a predetermined angle from the center position to both sides in the rotation direction, respectively. At this time, the ON state of the first start switch is maintained continuously from the center position to a middle position on a first rotation side to a position where the second start switch is turned on. Thus, when the driver twists the operation portion to the first rotation side, the system start during traveling can be performed. The operation portion is configured such that it is not self-retaining at the position where the second start switch is turned on, but it is urged to return in a counter-operating direction by the internal spring force by a slight angle from the maximum rotation angle, and the second start switch is turned off at this time. Therefore, the driver continues to urge the operation portion to the first rotation side with the driver's finger until the start is finished, and after confirming the start, the start state is maintained even if the driver releases the driver's finger from the operation portion.

On the other hand, in the case of twisting to a second rotation side opposite to the first rotation side from the center position, the first start switch is not turned on and the second start switch is turned on at the maximum rotation angle. Thus, when the driver twists the operation portion to the second rotation side, the system start during charging can be performed. The operation portion is not self-retaining at the position where the second start switch 64 is turned on, and the driver continues to urge the operation portion to the second rotation side with a finger until the start is completed, as on the first rotation side, and after confirming the start, the start state is maintained even if the finger is released from the operation portion. When the driver is to finish the system, the driver turns off the first start switch by returning the operation portion to the center position. The operation portion is configured capable of operating the first start switch and the second start switch by a mechanical link mechanism, for example.

According to the configuration of this example as above, the driver can start the system by only one action of twisting the operation portion. This can improve the operability of the driver. In this example, the other configurations and actions are the same as the configurations in FIG. 1 to FIG. 11.

REFERENCE SIGNS LIST

10 Electric work vehicle (vehicle)
12 Vehicle-body frame
14 Front wheel
16 Rear wheel
18 Lawn mowing device (work implement)
19 Mower deck
20 Traveling motor
22 Power transmission unit
24 Axle
26 Deck motor (working motor)
32 Steering handle
34 Steering shaft
36 Steering column
37 Steering panel
38 Upper-end plate portion
39 Charging port
42 Traveling inverter
44 Deck inverter
46 Control device (ECU)
48 Inverter mounting member
51 Driver's seat
52 Support member
60 Accelerator pedal sensor
62 Operation switch group
63 First start switch
64 Second start switch
65 Cruise switch
66 Working start switch
67 Emergency stop switch
68 Load vehicle-speed control switch
69 Working speed select switch
70 Backward-work permission switch
71 Junction box
72 Indicator
73 Remaining-charge display portion
74 Cumulative start-time display portion
75 Lamp
76 Brake pedal sensor

77 Seat sensor
80 DC-DC converter
81 Battery mount
82 Shaft portion
83 Nut
84 First column
85 Connecting portion
86 Second column
87 First plate
88 Second plate
89*a*, 89*b* Bolt
90 Battery
91 Bonnet
96 Heat sink
97, 98 Screw
100 Control portion
110 Control system
112 Main contactor (main switch)
113 Charging cable
114 Charging connector
115 Charger
116 Fuse
118 Sub contactor
120 Battery-malfunction response relay
122 Battery start relay

The invention claimed is:

1. A control system for an electric work vehicle, comprising:

a battery;

a traveling motor to which power is fed from the battery via a main switch;

a control device which controls an ON/OFF state of the main switch;

a DC-DC converter which steps down a voltage of the battery and outputs the voltage to the control device, and a first start switch which is interposed and connected between an output side of the DC-DC converter and the control device and capable of manual energization, wherein a primary side of the main switch is connected to an input side of the DC-DC converter with a second start switch capable of manual energization interposed therebetween, a secondary side of the main switch is directly connected to the input side of the DC-DC converter, and the control device is started by an output voltage of the DC-DC converter by an operation of the second start switch to an energized position; and when the second start switch is operated to the energized position and the first start switch is at the energized position, the control device turns on the main switch and maintains an ON state of the main switch even after the operation of the second start switch to a shut-off position.

2. The control system for the electric work vehicle, according to claim 1, further comprising:

a working motor for driving a work implement to which power is fed from the battery via the main switch, wherein when the first start switch is operated to a shut-off position, after executing predetermined end processing including setting of target rotation numbers of rotation speeds of the traveling motor and the working motor to 0, the control device turns off the main switch and stops power feeding to the traveling motor, the working motor, and the control device from the battery.

3. The control system for the electric work vehicle, according to claim 1, further comprising:

a charging port which is connectable to an external power-feed facility via a charger and is connected to the battery via the main switch, wherein when the second start switch is operated to the energized position, the first start switch is at a shut-off position, and the charger is connected to the charging port, the control device turns on the main switch, feeds power to the battery, and maintains the ON state of the main switch even after an operation of the second start switch to the shut-off position.

4. The control system for the electric work vehicle, according to claim 1, wherein the first start switch is a two-position switch; and the second start switch is a push switch in which a state operated to an energized position is not self-retained.

5. The control system for the electric work vehicle, according to claim 3, wherein when the charger is connected to the charging port, if charging is not started within a predetermined time from an operation of the second start switch to an energized position, the control device turns off the main switch as abnormality occurrence processing.

* * * * *